Jan. 30, 1923.

H. HERMAN.
IRONING BOARD.
FILED OCT. 10, 1918.

1,443,917.

INVENTOR.
Harry Herman,
BY Hazard & Miller
ATTORNEYS.

Patented Jan. 30, 1923.

1,443,917

UNITED STATES PATENT OFFICE.

HARRY HERMAN, OF PASADENA, CALIFORNIA.

IRONING BOARD.

Application filed October 10, 1918. Serial No. 257,582.

*To all whom it may concern:*

Be it known that I, HARRY HERMAN, a citizen of the United States, residing at Pasadena, in the county of Los Angeles and State of California, have invented new and useful Improvements in Ironing Boards, of which the following is a specification.

My invention relates to an ironing board and more particularly to a sleeve and shoulder ironing board.

An object of my invention is to provide a combined sleeve and shoulder board in such a way that they form a single utensil.

Another object is to provide a combined sleeve and shoulder board made in parts which may be readily detached and other similar parts substituted.

Another object is to provide a simple, convenient and inexpensive combination of a sleeve and shoulder board.

With these and other objects in view, my invention consists in the construction, combination and arrangement of parts hereinafter described and claimed.

In the accompanying drawings which form a part of this specification—

Figure 2:
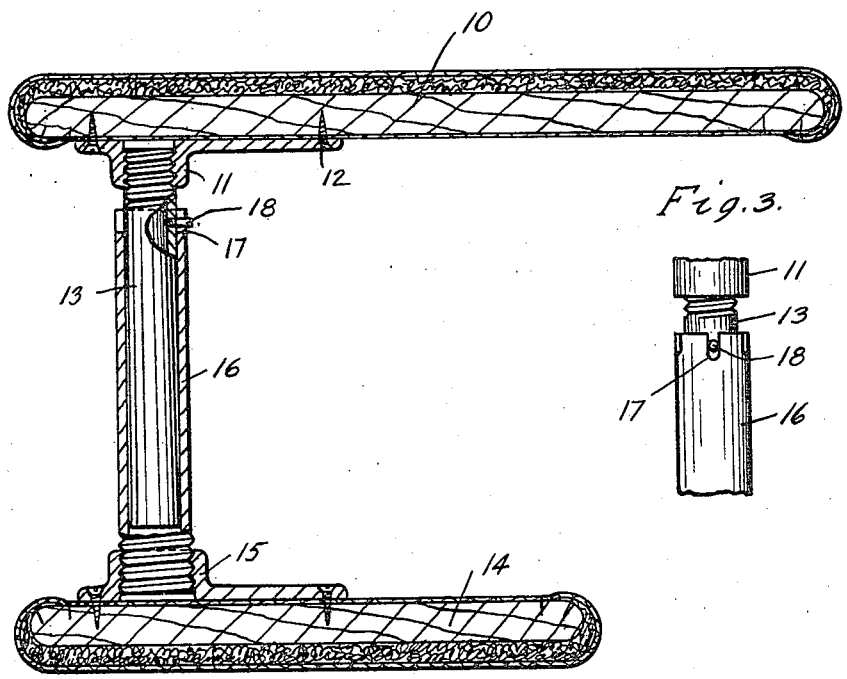
Fig. 2 is an enlarged central longitudinal vertical section taken on the line 2—2 in Fig. 1.
Figure 3:
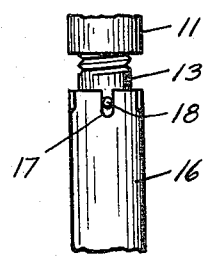
Fig. 3 is an enlarged fragmentary detailed view of the supporting column connecting the sleeve and shoulder parts of the board showing the pin slot locking device.

Referring to the reference numerals on the several figures, a sleeve board 10 has a flanged socket 11 fastened to the reverse side of its wider end by screws 12. This socket is internally threaded to receive the externally threaded end of a tubular shank 13 extending at right angles to the sleeve bar. A shoulder board 14 has a similar flange socket 15. This socket also internally threaded, is larger in size than socket 11 on the sleeve board and receives one end of an externally threaded tubular shank 16, of a sufficiently large diameter to telescope with tubular shank 13, pipe shank 16 extending at right angles to the shoulder board 14.

The shoulder and sleeve boards are padded on their working sides in the usual way. A plurality of relatively short slots or notches 17 are cut in the free end of shank 16 and a locking pin 18 is fixed in the side of the smaller shank 13 so as to engage in one of said slots 17 when the shanks are telescoped, thus preventing the sleeve board from twisting out of vertical alinement with the shoulder board and also providing means for permitting the sleeve board 10 to be shifted into practically any desired horizontal angle with respect to the shoulder board 14 and locked and retained in such angularly adjusted position. Furthermore, the pin and slot connection allows of the circumferential adjustment of one shank with respect to the other so that when assembling the two boards, the shanks may be tightly screwed within the respective sockets without the fear of the two boards being disalined when the shanks are associated with each other. It will be understood that the shank 13 can be adjusted circumferentially within the shank 16 to vertically aline the sleeve board with respect to the shoulder board, and that the pin and slot connection provides means for locking the shank in this adjusted position to maintain the alinement of the boards.

Figure 1:
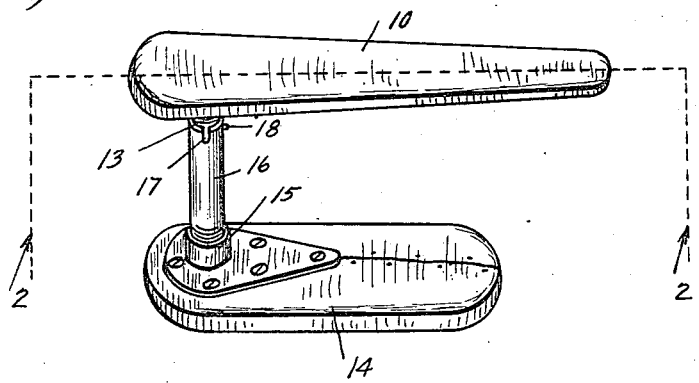
Figure 1 is a perspective view of a combination ironing board embodying the principles of my invention.

In using the ironing board when it is desired to use the sleeve board, the shoulder board is used as the foot, as shown in Figs. 1 and 2. When it is desired to use the shoulder board the combination is reversed in position, the sleeve board then being used as the foot. The telescoped tubes are made to fit rather snugly so as to form a rigid connection between the sleeve board and shoulder board and yet loosely enough so that the inner shank may be withdrawn and other boards of different size or shape similarly provided with tubular shanks substituted.

While I have shown the preferred construction of my ironing board, as now known to me, it will be understood that various changes in the construction, combination and arrangement of parts may be made by those skilled in the art without departing from the spirit of my invention as claimed.

I claim:

In combination, a sleeve board, a base board, sockets secured to the confronting sides of the boards, a tubular shank screw seated in the socket of the sleeve board, a second tubular shank seated in the socket of the base board and adapted to telescopically receive the shank of the sleeve board, circumferentially spaced notches formed in the free end of the shank of the base board, and a locking pin secured to the shank of the sleeve board and adapted to engage within any one of said notches for the purpose described.

In testimony whereof I have signed my name to this specification.

HARRY HERMAN.